United States Patent Office 3,527,644
Patented Sept. 8, 1970

3,527,644
ENZYME ACTIVATION FOR YEAST RAISED DOUGHS
Bert W. Landfried, Independence, Mo., and John R. Moneymaker, Overland Park, Kans., assignors to Top-Scor Products, Inc., Kansas City, Kans., a corporation of New York
No Drawing. Filed Jan. 2, 1968, Ser. No. 694,838
Int. Cl. A21d 2/16, 8/04
U.S. Cl. 99—91                                    10 Claims

ABSTRACT OF THE DISCLOSURE

The beneficial activities in yeast raised bakery products of fungal enzyme material derived from *Aspergillus oryzae* are enhanced by admixture with saturated monoglyceride prior to incorporation into the dough.

---

The Federal Standards of Identity (U.S.) for bread permit the fungal enzyme material derived from *Aspergillus oryzae* to be included as an optional ingredient. It is commonly acknowledged in the baking industry that the proteolytic activity of this enzyme material has a desirable effect on dough characteristics by decreasing optimum mixing time and improving dough machineability. This is particularly important in the case of unusually strong flours and often constitutes a valuable aid in adapting varying flours to the production schedules of mechanized bakeries. Further, doughs treated with this enzyme material have been widely observed to produce baked products with improved grain, texture and crumb structure, compared with the products of untreated doughs.

It is well accepted that the use of this enzyme material in dough produces partial hydrolysis of the gluten proteins and in this way reduces mixing requirements, however, the other improvements are believed to be related, at least in part, to additional reactions which are not well understood. Non-fungal enzyme materials are known which attack the gluten protein system rapidly and, therefore, reduce mixing requirements considerably, but, they do not exhibit the tolerance of enzyme material of fungal origin and, thus, tend to produce excessive proteolysis, leading to extensive impairment of product quality.

With reference to this invention, it has been determined that the beneficial activities in yeast raised bakery products of enzyme material derived from *Aspergillus oryzae* can be materially increased by intimate admixture with a quantity of monoglyceride derived from fully saturated edible fat. A significant increase in desirable enzyme material activity is achieved by the proportional incorporation of about 0.05 gram of the monoglyceride with a quantity of the enzyme equivalent to 1,000 Hemoglobin Units (HU) protease as determined by the standard method of the American Association of Cereal Chemists, known as AACC Method 22-60. Increased levels of the monoglyceride produce increased enzyme material function in yeast raised bakery products up to about 0.30 gram per 1,000 HU protease. Greater proportions of the monoglyceride do not appear to further improve the function of the enzyme material but produce the known desirable effects of monoglyceride addition in dough. The treated enzyme material has been observed to more efficiently improve dough characteristics, decrease dough formation time and increase average quality with or without shortened fermentation time.

The principal objects of the present invention are: to provide enhanced enzyme conditioning for dough to achieve faster and more uniform mixing without loss of control; to provide an improved enzyme material additive for achieving faster dough formation; to provide a treated enzyme material for obtaining improved quality with short fermentation time; to provide such improved functions with ingredients which are recognized as safe for addition to food products; to provide an improved dough additive system and method which simplifies the adaptation of various flours to mechanized bakeries; and to provide a versatile new additive composition and method for producing quality baked products consistently at lower cost.

Other objects and advantages of this invention will become apparent from the following description wherein is set forth by way of example certain embodiments of this invention.

Saturated monoglyceride, as referred to in the practice of this invention, is manufactured commercially through the reaction of fully hydrogenated edible fats with glycerol and has the empirical formula

$$CH_3(CH_2)_xCOOCH_2\text{---}CHOHCH_2OH$$

wherein $x$ is 12 to 18. Compounds similar in structure but prepared with unsaturated fatty acids have been found to be ineffective herein. Hydrogenated lard, tallow, soy oil, cottonseed oil, and other well known fats are commonly used as the saturated fatty acid source. Because stearic acid ester is generally present in greater quantity than derivatives of other fatty acids, the product is often referred to as glycerol monostearate.

Mixtures suitable for use as a source of monoglyceride in the practice of this invention include reaction products containing the monoglyceride together with diglyceride and trace amounts of triglyceride, glycerol and free fatty acids. Preferably, purified reaction products are used, such as the distilled monoglycerides which are available commercially and contain approximately 90% alpha mono-ester.

The saturated monoglyceride compounds referred to are generally hard, wax-like lipids at room temperature. Due to the relative instability of the enzyme material in the presence of free water and the relation of the desired reaction to exposure, the monoglyceride is preferably processed, prior to mixing with the enzyme material, into a low moisture, high surface dispersion. Satisfactory methods for the preparation of such dispersions include powdering, plating on food powder such as flour or vital wheat gluten, and co-spray drying of an aqueous dispersion with a liquid food, the resultant dry dispersion preferably having a particle size distribution wherein at least 50% are less than about 150 microns.

Monoglycerides of the type described herein, and other compounds of the homogolous series have long been used in the preparation of baked products as effective starch complexing agents, and when used at levels of 0.1% or greater, based on formula flour, act on the starch to significantly retard the apparent staling of yeast leavened products. Further, the incorporation of high purity, fully hydrogenated glycerol monostearate in baked products is known to act on the starch to provide significant quality improving effects. However, the use of monoglyceride per se does not alter the optimum mixing requirements of a yeast raised dough or otherwise significantly affect optimum formulation.

The discovery that the functionality of this enzyme material in yeast raised doughs is enhanced by the co-addition of monoglyceride was surprising since monoglyceride does not chemically resemble known substances which modify the activity of enzymes. Further, the novel activating effects were found to be evident at monoglyceride usage levels which are considered insignificant in dough systems.

In calculating the quantity of enzyme material to include in dough systems for a desired proteolytic effect, it is common to use a specialized procedure standardized by the American Association of Cereal Chemists and known as AACC Method 22–60. In using this procedure, the enzyme material quantity is expressed in terms of hemoglobin units (HU). For example, one gram of the enzyme material is equivalent to 1,000 hemoglobin units if 11.18 mg. produces an increase in soluble nitrogen of 5.00 mg. from 0.417 g. of hemoglobin in five hours at 40° C. and pH 4.7. This is equivalent to the enzyme material solubilizing approximately three times its weight of hemoglobin under these conditions. Since in normal dough use, only about 0.5 to 1.5 grams of the fungal enzyme material is used per 100 lbs. of flour, the enzyme material is commonly added to the dough as a minor ingredient in a mixture with starch, or the like, as a diluent.

The enzyme material also has a measure of diastatic activity which is believed to have substantially no effect on physical dough characteristics, although it may exert a desirable influence on fermentation, oven spring, crumb structure and crust color. Such diastatic acivity is commonly expressed in SKB alpha-amylase units and calculated by a procedure standardized by the American Association of Cereal Chemists and known as AACC Method 22–01.

The enzyme material is commercially available in concentrated form and diluted with starch or the like to a standardized activity per unit weight. The following examples will serve to illustrate the practice of this invention.

EXAMPLE I

A 90% alpha saturated monoglyceride (trademark Myverol 1800, Distillation Products Industries, Rochester, N.Y.) in a high surface dry dispersion was prepared by hot blending with flour. The flour and monoglyceride were heated, with mixing to avoid destructive overheating, to 160° F., then cooled with agitation to 115° F. The blend or plated flour was sifted, resulting in a particle size analysis as follows: 31% over 149 microns, 23% over 105 microns but under 149 microns, 20% over 74 microns but under 105 microns and 26% less than 74 microns. The blend was mixed with a standardized, diluted, powdered enzyme material of Aspergillus oryzae in different proportions so that the level of alpha monoglyceride per 1,000 standard hemoglobin units of protease activity varied from 0.03 gram to 0.32 gram. The enzyme material was a commercial preparation from Rohm & Haas, Co., Washington Square, Philadelphia (trademark Rhozyme J–25) containing 37,000 hemoglobin units per gram. The various proportions of enzyme material and monoglyceride follow:

Preparation:      Alpha monoglyceride per 1,000 HU, gms.
1 ---------------------------------------- 0.03
2 ---------------------------------------- 0.06
3 ---------------------------------------- 0.13
4 ---------------------------------------- 0.20
5 ---------------------------------------- 0.26
6 ---------------------------------------- 0.32

These preparations, along with three controls respectively containing no additive, enzyme material only, and the highest level monoglyceride without enzyme material, were included in a standard commercial white bread formula at levels adjusted to introduce 1,400 Hemoglobin Units of protease per pound of formula flour. This quantity of enzyme material is within the range which may be used commercially with normal mixing, however, to illustrate the operation of this invention, all the doughs were intentionally mixed less than the known optimum for the flour used. A conventional sponge-dough preparation method was employed, and the preparations were introduced with the sponge ingredients in the normal manner. The condition of the dough following mixing and rounding was carefully examined by a trained observer and judged. The bread formula follows:

|  | Parts by wt. |
|---|---|
| Patent flour (14% moisture basis) | 700.00 |
| Bakers yeast | 17.50 |
| Sucrose | 28.00 |
| Cerelose | 28.00 |
| High heat non-fat milk solids | 28.00 |
| Lard | 17.50 |
| Salt | 14.00 |
| Arkady yeast food | 3.50 |
| Water | 469.00 |

Each test was performed in duplicate. Following baking in one-pound units, the loaves were allowed to cool under controlled conditions and stored in polyethylene bags for 18 hours. Loaf volume was then measured by rape seed displacement and the test bread was cut and scored subjectively using a system which separately takes into account the major internal and external characteristics of the loaves. These characteristics include loaf volume, crust color, crust character, break and shred, grain, texture, crumb color, aroma, taste and eating quality. In this scoring system each factor is considered separately and penalized according to the degree of deviation from a hypothetical perfect loaf which would score 100. An acceptable commercial loaf will receive a score of 90 or higher, with a score of 94 or higher considered excellent. This system is based essentially on that promulgated by the American Institute of Baking and is comparable to the various methods in use throughout the baking and milling industries. Variation in quality scores within a single test series of one point or greater is considered significant. The results follow:

DOUGH CHARACTERISTICS

| Variables | At mixer | At rounder | Average 1-lb. loaf volume, cc. | Average quality score |
|---|---|---|---|---|
| No additive | Bucky (under mixed) | Stiff | 2,625 | 92.0 |
| Enzyme material only | do | do | 2,687 | 92.0 |
| Preparation 1 | do | do | 2,675 | 92.0 |
| Preparation 2 | Well developed | Normal | 2,675 | 93.5 |
| Preparation 3 | do | do | 2,725 | 95.0 |
| Preparation 4 | do | do | 2,663 | 94.0 |
| Preparation 5 | Over developed | Soft | 2,650 | 93.0 |
| Preparation 6 | do | do | 2,700 | 93.0 |
| High level of mono only | Bucky (under mixed) | Stiff | 2,625 | 93.0 |

Dough characteristics during make-up and the volume and quality of the resultant bread showed the activity improving function of the preparations embodying this invention. Improved dough development was recorded with the addition of 0.06 gram of alpha monoglyceride per 1,000 HU of activity. Further enhanced activity was achieved by greater proportions of the ester, up to 0.26 gram per 1,000 HU. The higher level of 0.32 gram per 1,000 HU produced no discernible further increased enzyme material activity. It is significant that the enzyme material without the ester was insufficiently functional, with the less than optimum mixing, to significantly alter dough characteristics. Further, the monoglyceride at the highest level tested, which amounts to about 0.1% based on the formula flour, did not alter dough characteristics. Higher than control score in this case was due to improved softness and texture.

EXAMPLE II

The procedure described in Example I was repeated to obtain comparative data between a powdered, saturated mono-diglyceride (unplated on flour or the like) and the 90% flour plated monoglyceride of Example I. In this example the mono-diglyceride was a commercial saturated preparation offered for sale by the Glidden Co. (Durkee), Chicago, Illinois (trademark SGF 287E) containing 53.9% alpha monoglyceride with most of the balance diglyceride. The particle size distribution was 35% over 149 microns, 20% over 105 microns but under 149 microns, 18% over 74 microns but under 105 microns and 27% less than 74 microns. The two monoglyceride products were mixed with the same standardized enzyme product used in Example I in different proportions so that, in each case, the alpha monoglyceride introduced per 1,000 standard Hemoglobin Units of protease activity was 0.13 gram. These preparations along with appropriate controls were evaluated in bread preparations as in Example I. Again, the level of enzyme material addition was held constant at 1,400 HU per pound of formula flour. Dough mixing times in each case were held constant. Results follow:

EXAMPLE III

A representative sweet dough formula, detailed below, was produced by a conventional sponge dough procedure.

Formula

Sponge ingredients: Parts by wt.
Patent flour _____ 420.0
Arkady yeast food _____ 3.5
Bakers yeast _____ 28.0
Water _____ 270.0

Dough ingredients: Parts by wt.
Patent flour _____ 175.0
Cake flour _____ 105.0
Granulated sucrose _____ 126.0
Non-fat dry milk solids _____ 28.0
Vegetable shortening _____ 70.0
Monoglyceride softener _____ 14.0
Salt _____ 14.0
Egg yolk solids _____ 14.0
Bakers yeast _____ 28.0
Water _____ 166.0

The enzyme material used was from Rohm & Haas (trademark Rhozyme J–25) containing 38,600 HU per gram and 6,700 SKB alpha-amylose units per gram. A saturated, distilled monoglyceride, 90.6% alpha, derived from tallow was dispersed therewith as described in Example I. A control preparation containing only enzyme material and no activator was prepared along with a preparation containing enzyme material activated with 0.30 gram of the monoglyceride per 1,000 HU of protease. Both preparations were added with the sponge ingredients to a level of 1,760 HU per pound of formula flour. The results follow:

DOUGH CHARACTERISTICS

| Variable | At mixer | At molder | Average 1-lb. loaf volume, cc. | Average quality score |
| --- | --- | --- | --- | --- |
| Enzyme material only | Normal | Fair | 2,612 | 91 |
| Activated enzyme material | do | Excellent | 2,700 | 94 |

In this test the increase in dough improving effects by the enzyme material when activated as described was less obvious at the mixer due to the nature of the high sugar dough. Effects were first noted at molding where the treated enzyme material in the dough was observed to exhibit improved development leading to superior make-up and subsequent quality.

DOUGH CHARACTERISTICS

| Variable | At mixer | At rounder | Average 1-lb. loaf volume, cc. | Average quality score |
| --- | --- | --- | --- | --- |
| No additive | Undermixed | Stiff | 2,500 | 88.0 |
| Enzyme material only | do | do | 2,700 | 93.0 |
| Enzyme material and distilled mono | Well developed | Normal | 2,750 | 96.0 |
| Enzyme material and mono-di | do | do | 2,675 | 94.5 |
| Distilled mono only | Undermixed | Stiff | 2,638 | 92.5 |
| Mono-di only | do | do | 2,765 | 92.0 |

The functionality of the fine particle size mono-diglyceride, while somewhat less than that achieved with the distilled monoglyceride powdered dispersion, was clearly evident.

EXAMPLE IV

Enzyme material sold commercially by Miles Laboratories, Inc., Elkhart, Ind. (trademark Takamine Fungal)

having 30,200 HU and 5194 SKB per gram was mixed with a fully hydrogenated distilled monoglyceride derived from vegetable oil and containing 91.2% alpha monoglyceride (trademark Myverol 1807, Distillation Products). The monoglyceride and enzyme material were blended as described in Example I in preparing a composition containing 0.14 grams of alpha monoglyceride per 1,000 HU. A control blend containing the same amount of enzyme material without monoglyceride was prepared for comparison.

The white pan bread formula and preparation method detailed in Example I were again used, and enzyme material was introduced with the sponge ingredients at a level sufficient to produce 1,300 HU per pound of formula flour. Duplicate doughs were mixed for varying periods. Results follow:

| Variables | Dough mixing time, min. | At mixer | At rounder | Average 1-lb. loaf volume; cc. | Average quality score |
|---|---|---|---|---|---|
| No additive | 4 | Bucky (undermixed) | Stiff | 2,487 | 91.0 |
| Enzyme material only | 4 | do | do | 2,625 | 93.0 |
| Enzyme material and mono | 4 | Well developed | Normal | 2,650 | 95.0 |
| No additive | 6 | Undermixed | do | 2,600 | 91.5 |
| Enzyme material only | 6 | Well developed | do | 2,580 | 91.0 |
| Enzyme material and mono | 6 | Very well developed | Soft | 2,625 | 93.0 |
| No additive | 8 | Well developed | Normal | 2,613 | 92.0 |
| Enzyme material only | 8 | Over developed | do | 2,600 | 89.0 |
| Enzyme material and mono | 8 | do | Soft | 2,575 | 87.0 |

The activation of the enzyme material to roduce the required mixing of the dough was again clearly demonstrated. At every mixing time tested the activated enzyme material preparation provided significantly greater functionality than the non-activated blend of equal enzyme material activity. Enhancement of the finished product quality improving effects of enzyme material addition was also demonstrated.

EXAMPLE V

The procedure and monoglyceride described in Example IV was repeated using enzyme material from another commercial source (Rohn & Haas trademark Rhozyme A-4) having 52,600 HU and 2485 SKB per gram. The enzyme material was introduced at a level of 1,100 HU per pound of flour. The level of alpha monoglyceride was 0.165 gm. per 1,000 HU of enzyme material and dough mixing time was held constant. Test results follow:

| Variable | At mixer | At rounder | At molder | Average 1-lb. loaf volume, cc. |
|---|---|---|---|---|
| No additive | Bucky | Stiff | Fair | 2,500 |
| Enzyme material only | Well developed | Normal | Normal | 2,580 |
| Enzyme material and mono | Very well developed | do | Excellent | 2,700 |

The improved functionality of the treated enzyme material was again demonstrated.

EXAMPLE VI

Vital wheat gluten, itself a known flour additive, was used in the preparation of a high surface dry dispersion. 80% protein gluten powder and the distilled monoglyceride used in Example I were heated, with continuous mixing to avoid destructive overheating, to 160° F., then cooled with agitation to 115° F., and sifted. The particle size distribution of the finished material was 11% over 149 microns, 19% over 105 microns but less than 149 microns, 25% over 74 microns but less than 105 microns, and 45% less than 74 microns. Part of the gluten material was used to prepare an enzyme material additive containing 0.28 gm. alpha monoglyceride per 1000 HU protease activity and the balance held for baking comparison. A second control preparation containing the identical level of the same enzyme material diluted in the gluten powder only was likewise prepared.

The bake test method outlined in Example I was employed. Enzyme material containing preparations were introduced at a level sufficient to cause addition of 790 HU per pound of flour. Dough mixing was constant and intentionally less than the optimum necessary under no-additive conditions. The results follow:

| Variable | At mixer | At rounder | Average 1-lb. loaf volume, cc. | Average quality score |
|---|---|---|---|---|
| No additive | Undermixed | Stiff | 2,500 | 92.0 |
| Enzyme material gluten | do | Normal | 2,710 | 93.5 |
| Mono-gluten | do | Stiff | 2,540 | 92.0 |
| Enzyme material mono-gluten | Slightly undermixed | Normal | 2,700 | 95.0 |

Enzyme material addition again produced significant improvement in both dough condition following mixing and resultant bread quality, however, significantly greater conditioning activity and improvement in the finished product resulted from activated enzyme material addition. Thus, a combination of active ingredients may be used to produce a multi-purpose additive which incorporates the advantages of this invention.

EXAMPLE VII

Using the bread dough formula detailed in Example I sponges were prepared in the normal manner using 65% of the total formula flour. An absorption of 64% of weight of flour in the sponge only was added to the flour for sponging, together with the entire amount of yeast, yeast food and test preparations.

Following fermentation for 4 hours at 80° F. and an atmosphere of 91% relative humidity, the balance of the formula ingredients were added and the total combination mixed at low speed (not the normal speed of Example I), using a Hobart A-120 mixer equipped with a jacketed bowl. The time required for a dough to form completely under these conditions was measured. Clean up or complete dough formation was reported to the nearest minute. Tests were conducted in triplicate with identical results in each instance. Enzyme material was introduced with the sponge ingredients at the level of 1,500 HU per lb. of flour. The activator level for the enzyme material was 0.30 gram alpha monoglyceride per 1,000 hemoglobin units, prepared by the previously described dry dispersion method. In addition, activator only was added to the total combination as a hydrate along with untreated enzyme. Results follow:

| Test variables: | Dough "clean up" time (min.) |
|---|---|
| No additive | 7 |
| Enzyme material only | 4 |
| Enzyme material with hydrate activator added separately | 4 |
| Activator only (plated) | 7 |
| Enzyme material with activator (plated) | 2 |

A marked change in the time required for a dough to form was observed with anzyme material addition with or without activator added separately, however, with monoglyceride activated enzyme material, a further significant reduction in clean up was demonstrated. The use of monoglyceride only appeared totally ineffective in reducing clean up time.

EXAMPLE VIII

The formula and agents were prepared as described in Example I but sponge fermentation time was shortened from standard or accepted practice for the preparation of quality white bread. Enzyme material was introduced in the sponge at the level of 1,000 HU per pound of flour, and the activator level used was 0.18 gm. alpha monoglyceride per 1,000 hemoglobin units. Enzyme material alone was tested along with the activated enzyme material product and a no additive control. Formula and procedure were held constant except for the stated variables and evaluations were conducted in duplicate.

| | Variables | | Dough Condition | | |
|---|---|---|---|---|---|
| Additive | Dough mixing time, Min. | Mixer | At molder | Average 1-lb. loaf volume, cc. | Average quality score |
| No additive | 10 | Bucky | Fair | 2,687 | 90 |
| Enzyme material only | 6 | Well developed | Normal | 2,737 | 92.0 |
| Enzyme material-mono | 6 | ....do | ....do | 2,762 | 93.5 |

Under these conditions no significant change in mixing requirement or dough condition was observed compairing the product of this invention with the enzyme material control. However, total quality was significantly improved with use of the activated preparation, demonstrating quality improvement not directly associable with dough condition.

It is to be understood that, while certain forms of this invention have been described, it is not to be limited thereto except insofar as such limitations are included in the following claims:

What I claim and desire to secure by Letters Patent is:

1. For incorporation into yeast raised doughs in an amount equivalent to at least about 790 Hemoglobin Units of protease per pound of formula flour, an additive composition comprising:
  (a) a premixture of enzyme material derived from *Aspergillus oryzae* and a low moisture dispersion of monoglyceride,
  (b) said monoglyceride being derived from fully saturated fat forming fatty acids conting 14 to 20 carbon atoms, said mixture having a proportion of at least about 0.05 gram of alpha monoglyceride to the quantity of said enzyme material equivalent to 1,000 Hemoglobin Units protease as determined by the AACC Method 22–60.

2. The composition as set forth in claim 1 wherein said monoglyceride is in the form of particles comprising a powdered dough ingredient with monoglyceride plated thereon.

3. The composition as set forth in claim 2 wherein said powdered dough ingredient is flour.

4. The composition as set forth in claim 2 wherein said powdered dough ingredient is vital wheat gluten.

5. The composition as set forth in claim 1 wherein said monoglyceride is in the form of particles having a size distribution wherein at least 50% are less than about 150 microns in size.

6. The composition as set forth in claim 1 wherein said monoglyceride is contained in a mixture which comprises about 90% alpha monoglyceride.

7. The composition as set forth in claim 1 wherein said monoglyceride is contained in a mixture which comprises about 50% alpha monoglyceride and the major portion of the balance is diglyceride.

8. The method of increasing the functionality in yeast raised doughs of enzyme material derived from *Aspergillus oryzae*, for addition to said doughs in an amount equivalent to at least about 790 Hemoglobin Units of protease per pound of formula flour, which includes the step of:
  (a) premixing with said enzyme material prior to dough inclusion a low moisture dispersion of monoglyceride derived from fully saturated fat forming fatty acids containing 14 to 20 carbon atoms,
  (b) said enzyme material and monoglyceride dispersion being mixed in a proportion of at least about 0.05 gram of alpha monoglyceride to the quantity of said enzyme material equivalent to 1,000 Hemoglobin Units protease as determined by the AACC Method 22–60.

9. The method as set forth in claim 8 wherein said monoglyceride is introduced in the form of particles having a size distribution wherein at least 50% are less than about 150 microns in size.

10. The method as set forth in claim 8 wherein said monoglyceride is plated on a powdered dough ingredient prior to said mixing.

References Cited

UNITED STATES PATENTS

| 2,875,064 | 2/1959 | Glabe | 99—91 |
|---|---|---|---|
| 3,111,409 | 11/1963 | Jackson et al. | 99—91 |

JAMES R. HOFFMAN, Assistant Examiner